May 24, 1960  J. M. MORGAN, JR  2,937,577
TRACING APPARATUS
Original Filed Dec. 28, 1954
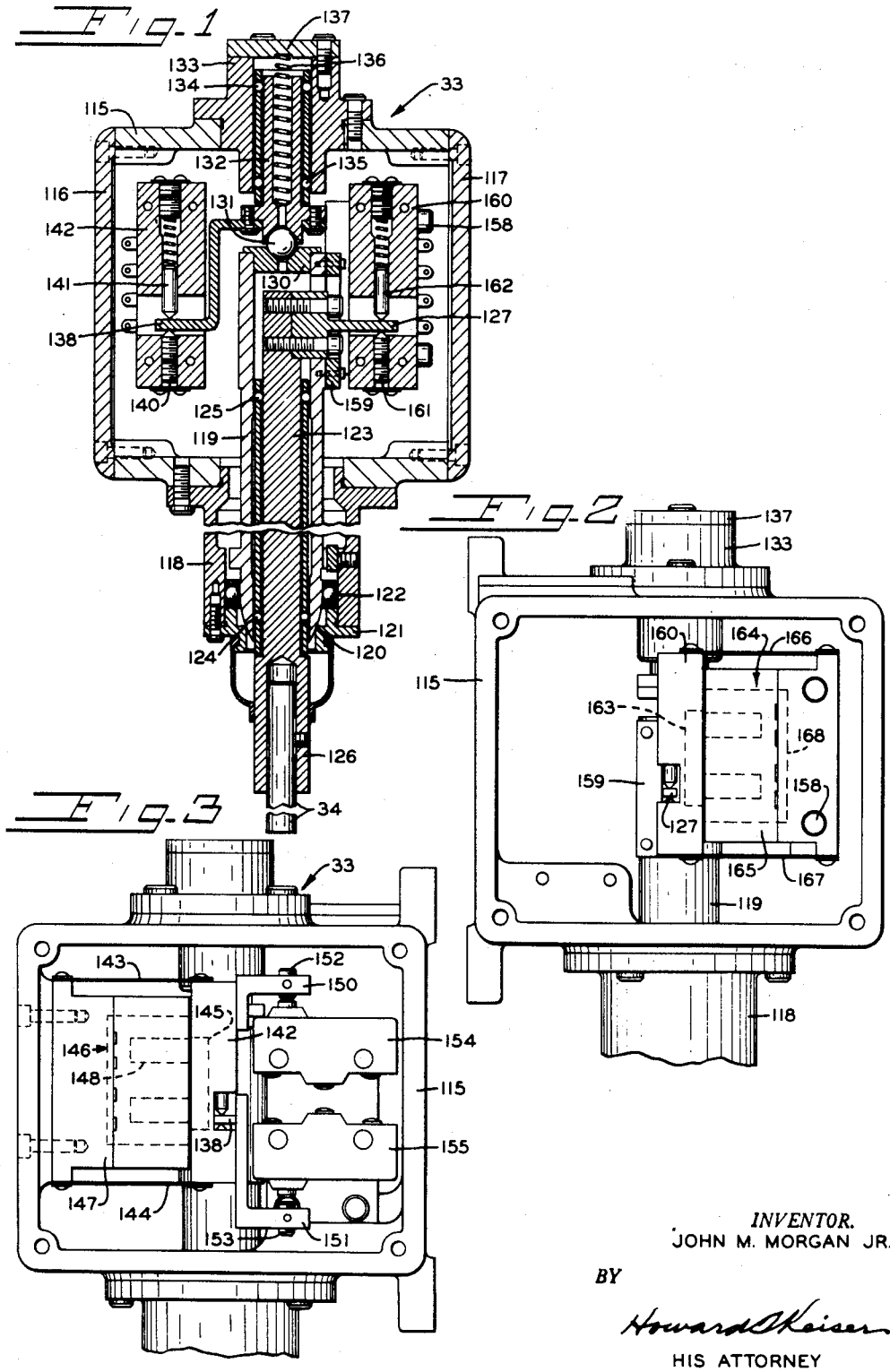
INVENTOR.
JOHN M. MORGAN JR.
BY
Howard S Keiser
HIS ATTORNEY

United States Patent Office 2,937,577
Patented May 24, 1960

2,937,577

TRACING APPARATUS

John M. Morgan, Jr., Montgomery, Ohio, assignor to The Cincinnati Milling Machine Co., Cincinnati, Ohio, a corporation of Ohio Original application Dec. 28, 1954, Ser. No. 477,976, now Patent No. 2,868,087, dated Jan. 13, 1959. Divided and this application Oct. 13, 1958, Ser. No. 766,968

2 Claims. (Cl. 90—62)

This invention relates to a tracing head for a tracer control system and, more particularly, to a tracing head provided with a tracing finger adapted to follow the pattern being traced and produce electrical signals which are indicative of the over-deflection or underdeflection of the finger by the pattern.

This application is a division of my co-pending patent application Serial No. 477,976 for Tracing Apparatus filed December 28, 1954, now Patent No. 2,868,087 issued January 13, 1959.

The tracing head and finger forming the subject matter of the present invention are adapted to sense deviations in the path followed by the tracing head from the outline of the pattern in both a contouring plane and also in a direction normal thereto so as to provide full 3-dimensional tracing of the pattern by the tracing apparatus. Accordingly, the tracing head is provided with one signal producing means which senses deflection of the tracing finger for 360° tracing in the contouring plane, and with another signal producing means which senses deflections of the finger in a direction at right angles to the contouring plane. The unique construction of the tracing head which permits the simultaneous production of these two signals will be hereinafter described in greater detail.

It is therefore an object of the present invention to provide a 3-dimensional tracing head having a single tracing finger arranged to simultaneously produce both depth and 360° tracing signals.

Another object of the invention is to provide a tracing head having a tracing finger supported for both lateral and axial deflections by the pattern and adapted to produce simultaneously one signal which is indicative of lateral deflections of the finger by the pattern, and another signal which is indicative of axial deflections of the finger thereby.

With these and other objects in view which will become apparent from the following description, the invention includes certain novel features of construction and combinations of parts, the essential elements of which are set forth in the appended claims, and a preferred form or embodiment of which will hereinafter be described with reference to the drawings which accompany and form a part of this specification.

Referring to the drawings in which like reference numerals indicate like or similar parts:

Fig. 1 is a cross-sectional elevation of the tracing head as viewed from the rear.

Fig. 2 is a left side view of the tracing head with the cover removed.

Fig. 3 is a right side view of the tracing head with the cover removed.

The tracing head herein disclosed is particularly suitable for use in a tracing system of the type described in my co-pending patent application Serial No. 477,976 although its utility is not necessarily limited to a tracing system utilizing a non-directional type of tracer as shown therein. The instant tracing head could equally well be adapted for use as a directional type of tracer by making provision for rotating the head in synchronism with the direction controlling mechanism for the feed motors, and by introducing a suitable amount of eccentricity to the tracing finger as is well known in the tracer art. The novelty in the present tracing head resides in the particular means utilized for simultaneously producing both 360° and depth signals from a single tracing finger. For this purpose, the tracing head includes an outer sleeve which is mounted for 360° tilting movement about its point of support in the tracing head. Mounted for axial sliding movement within the sleeve is a stem or plunger which carries at its outer end a tracing finger adapted to contact and follow the pattern to be traced. A 360° signal producing device, or pickup, is supported by the tracing head and provides signals indicative of the degree of tilt of the sleeve and finger relative to the head through a motion transmitting mechanism which connects the sleeve to a movable armature in the pickup. A second signal producing device, or pickup, is carried by the sleeve and provides a second, or depth signal, which is indicative of the axial displacement of the stem relative to the sleeve. This is effected by a connection between the stem and a movable armature carried by the second pickup. The tracing head is thereby enabled to produce both signals simultaneously as the finger is displaced both laterally and axially by the pattern being followed. It is, of course, possible to select one or the other of the signals for use if both are not needed for the type of operation being performed. That is, for 360° tracing only, the 360° signal may be selected for use to the exclusion of the depth signal, while for depth tracing only, the depth signal may be selected to the exclusion of the 360° signal.

The tracing head will now be described in greater detail in connection with a preferred embodiment of the invention which has been shown in the accompanying drawings. As herein shown the head is housed in a box-like casing 115 having a pair of removable cover plates 116 and 117 for enclosing the right and left sides thereof, respectively. Secured to the bottom of the casing is a cylindrical housing 118 in which is received the lower end of a sleeve 119. This sleeve is supported at its lower end within the housing 118 by a shoulder 120 formed on a cap 121 secured to the bottom end of the housing, and also by a ball bearing 122 resting on top of the cap 121. Lying within the sleeve 119 is a tracing finger plunger 123 which is mounted for longitudinal sliding movement within the sleeve by ball bearings 124 and 125. At its lower end, the plunger 123 is provided with a chuck 126 for holding the tracing finger 134, while at its upper end, the plunger is fitted with a lateral extension 127, which projects through a slot provided in the sleeve 119.

The upper end of the sleeve 119 is fitted with a cap 130 provided with a conical seat in which is received a ball 131. Resting on the top of the ball 131 is a sleeve 132 which, like the cap 130, is formed with a conical seat for engaging the ball 131. The sleeve is mounted for axial sliding movement within a cylindrical bore provided in a bushing 133 reecived in an aperture provided in the top of the casing 115. The sleeve 132 is guided for sliding movement within the bushing by means of ball bearings 134 and 135 and is spring urged downwardly into contact with the ball 131 by a compression spring 136 lying inside the sleeve and bearing against a cover 137 fastened to the top of the bushing. Secured to the lower end of the sleeve 132 is an offset lateral extension 138 which will occupy its lowermost position when the tracing finger 34 is in its undeflected, or Fig. 1 position. However, any sidewise pressure applied against the finger 34 will cause the sleeve 119 to be rocked about its base and result in raising the sleeve 132 and extension 138.

As shown in Fig. 1, the extension 138 is connected to an armature carrier 142 so as to cause the carrier to partake of its up and down movement in response to sidewise movement of the tracing finger. The connection between the extension and carrier includes a pointed screw 140 threaded into a hole in the bottom of the carrier, and a spring pressed plunger 141, also pointed, which bears against the upper face of the extension and maintains it in contact with the pointed end of screw 140. The carrier 142 is made of nonmagnetic material and carries a soft iron armature 145 (Fig. 3) which, together with an E-magnet 148, forms a differential transformer 146. The E-magnet is mounted on a holder 147 which is screwed fast to the casing 115 while the carrier is supported for vertical movement by a pair of reeds 143 and 144 fastened to the holder 147. In Fig. 3 the carrier is shown in the position which it occupies when the tracing finger in undeflected wherein there is a greater overlap of the bottom pole than of the upper pole by the armature. When the tracing finger 34 is deflected sufficiently to equalize the overlap of the armature 145 with the poles of the E-magnet 148, the magnetic circuit of the transformer will be balanced and, the error signal from the tracing head will be zero. This, then, will represent what may be termed the "normal" or "null" position of the tracing finger 34.

The carrier 142 also carries upper and lower brackets 150 and 151, respectively, the laterally extending arms of which are fitted with adjustment screws 152 and 153, respectively. The adjustment screws are adapted to cooperate with the operating buttons of a pair of normally closed limit switches 154 and 155 supported on the casing 115. When the carrier 142 is in the position shown in Fig. 3, that is, in the position it occupies when the tracing finger 34 is undeflected, the adjustment screw 152 will hold the contacts of the switch 154 open but will permit them to close upon slight upward movement of the carrier resulting from initial deflection of the finger 34 by the pattern. Adjustment screw 153 is spaced a sufficient distance from the operating button of switch 155 so as not to become effective to open the contacts of the switch until the carrier has been moved upwardly to a considerably degree. The limit switches 154 and 155 serve to sense contact of the tracing finger with the pattern and overdeflection of the tracing finger by the pattern respectively.

The extension 127 carried by the plunger 123 (Fig. 3) is adapted to control the movement of an armature carrier 160 which, like the carrier 142, is connected with the extension by a screw 161 engaging with the bottom of the extension and a spring pressed pin 162 engaging with the top of the extension. The carrier will thereby be constrained to follow the movements of the extension 127 which moves up and down in response to vertical movement of the tracing finger 34.

The carrier 160 is constructed of non-magnetic material and has embedded therein a soft iron armature 163 (Fig. 2) which lies adjacent the pole faces of an E-magnet 168 of a differential transformer 164. The E-magnet is mounted in a holder 165 supported on the sleeve 119 by a bracket 159 pinned to the sleeve to which the holder is fastened by screws 158, while the carrier 160 is supported for translational movement by a pair of reeds 166 and 167 which are attached to the holder 165. In Fig. 2 the carrier 160 is shown in the position it occupies when the tracing finger 34 is in its lowermost position. When the carrier is in this position, the armature 163 lies below its centered position with respect to the poles of the E-magnet 168. The carrier is urged toward this position by the force of gravity acting on the plunger 123 which biases it toward the position shown in Fig. 1 where the bottom edge of the piece on which extension 127 is formed lies against the bottom edge of the slot formed in the sleeve 119. This defines the lowermost position of the plunger and upward pressure on the bottom of the tracing finger 34 will be effective to raise the plunger and move the armature 163 upwardly toward the centered position with respect to the poles of the E-magnet 168.

From the foregoing it will be noted that the tracing head 33 is sensitive both to sidewise deflection of the tracing finger 34, which causes vertical movement of the extension 138, and also to vertical displacement of the finger, which causes vertical movement of the extension 127. Hence, the tracing head is of a three dimensional character, the extension 138 responding to horizontal deflections of the tracing finger from any direction within a full 360°, and the extension 127 responding to vertical deflections of the finger.

While I have described my invention in connection with one possible form or embodiment thereof, and have used, therefore, certain specific terms and language therein, it is to be understood that the present disclosure is illustrative rather than restrictive and that changes and modifications may be resorted to without departing from the spirit of the invention as defined by the claims which follow.

I claim:

1. A tracing head for contour tracing apparatus comprising a frame, a sleeve fulcrumed for rocking movement on said frame from an underdeflected position through a null position to an overdeflected position, a spring biased element mounted on said frame for reciprocable movement axially of said sleeve, means including a conical seat on the end of said sleeve, and a ball in said seat, for transforming the rocking movement of said sleeve into reciprocatory movement of said element, an electrical pickup operable by said element to provide a signal signifying the position of said sleeve, relative to said frame, a tracing finger plunger journaled in said sleeve for longitudinal sliding movement therein from an underdeflected position through a null position to an overdeflected position, an aperture in said sleeve, a lateral extension on said plunger projecting through said aperture, and an electrical pickup connected with said extension for operation thereby to provide a signal signifying the position of the plunger within said sleeve.

2. The tracing head of claim 1 wherein said first-mentioned pickup is supported on said frame, and said second-mentioned pickup is supported on said sleeve.

References Cited in the file of this patent

UNITED STATES PATENTS

| 2,395,525 | Wilkie et al. | Feb. 26, 1946 |
| 2,470,244 | Fryklund | May 17, 1949 |

FOREIGN PATENTS

| 512,234 | Great Britain | Aug. 30, 1939 |